(12) United States Patent
Brunet et al.

(10) Patent No.: US 8,621,979 B2
(45) Date of Patent: Jan. 7, 2014

(54) LUBRICATION SYSTEM FOR A RECIPROCATING APPARATUS

(75) Inventors: John Dexter Brunet, Duncan, OK (US); David Mark Stribling, Duncan, OK (US); Dickey Charles Headrick, Duncan, OK (US); Ivan L. Blanco, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 488 days.

(21) Appl. No.: 13/049,659

(22) Filed: Mar. 16, 2011

(65) Prior Publication Data

US 2012/0234539 A1    Sep. 20, 2012

(51) Int. Cl.
*F01B 31/10* (2006.01)
*E21B 43/26* (2006.01)
*E21B 33/00* (2006.01)

(52) U.S. Cl.
USPC ........................ 92/157; 166/308.1; 166/285

(58) Field of Classification Search
USPC ......... 166/90.1, 305.1, 308.1, 285; 184/6.28, 184/26; 92/153, 157, 158
See application file for complete search history.

(56) References Cited

U.S. PATENT DOCUMENTS

| | | | | |
|---|---|---|---|---|
| 1,574,181 A * | 2/1926 | Baker | | 184/11.4 |
| 1,881,951 A * | 10/1932 | Rayfield | | 184/13.1 |
| 2,317,004 A * | 4/1943 | Wallgren et al. | | 92/156 |
| 2,380,907 A * | 7/1945 | Hall | | 92/84 |
| 2,456,668 A * | 12/1948 | Anderson | | 123/41.38 |
| 3,131,785 A * | 5/1964 | Blank | | 184/6 |
| 3,314,337 A * | 4/1967 | Payne et al. | | 92/157 |
| 3,394,633 A * | 7/1968 | Payne et al. | | 92/144 |
| 3,545,569 A * | 12/1970 | Alcock | | 184/6.8 |
| 3,656,582 A * | 4/1972 | Alcock | | 184/6.5 |
| 3,785,459 A * | 1/1974 | Patchen | | 184/6.5 |
| 3,817,663 A * | 6/1974 | Zehner | | 417/569 |
| 4,567,815 A * | 2/1986 | Kocher | | 92/261 |
| 4,872,395 A | 10/1989 | Bennitt et al. | | |
| 4,938,121 A * | 7/1990 | Melchior | | 92/110 |
| 5,247,873 A | 9/1993 | Owens et al. | | |
| 5,669,285 A | 9/1997 | Wiczynski et al. | | 92/157 |
| 5,713,262 A * | 2/1998 | Sugiyama et al. | | 92/158 |
| 6,859,740 B2 | 2/2005 | Stephenson et al. | | |
| 6,979,125 B2 * | 12/2005 | Vicars | | 384/11 |
| 7,219,594 B2 * | 5/2007 | Kugelev et al. | | 92/144 |
| 7,563,076 B2 | 7/2009 | Brunet et al. | | |
| 7,610,847 B2 | 11/2009 | McKelroy | | |
| 2009/0142199 A1 | 6/2009 | Blanco | | |
| 2009/0252616 A1 | 10/2009 | Brunet et al. | | |
| 2010/0172778 A1 | 7/2010 | Kugelev et al. | | |
| 2010/0300683 A1 | 12/2010 | Looper et al. | | |
| 2010/0310384 A1 | 12/2010 | Stephenson et al. | | |

* cited by examiner

*Primary Examiner* — William P Neuder
*Assistant Examiner* — Michael Wills, III
(74) *Attorney, Agent, or Firm* — John Wustenberg; Conley Rose, P.C.

(57) ABSTRACT

A positive displacement pump comprising a lubricant manifold comprising a first fluid pathway, a housing comprising a second fluid pathway in fluid communication with the first pathway, a crosshead slide within the housing and comprising a third fluid pathway in fluid communication with the second pathway; a crosshead configured to reciprocate within the crosshead slide, the crosshead comprising a fourth fluid pathway in fluid communication with the third pathway, the crosshead further comprising a wrist-pin having a fifth fluid pathway in fluid communication with the fourth pathway, a crankshaft within the housing, and a connecting rod disposed between the crosshead and the crankshaft and connected thereto, wherein the connecting rod comprises a sixth fluid pathway displaced from the connecting rod centerline and in fluid communication with the fifth pathway, and wherein the crankshaft end of the connecting rod comprises a seventh fluid pathway in fluid communication with the sixth pathway.

20 Claims, 8 Drawing Sheets

LUBRICATION SYSTEM FOR A RECIPROCATING APPARATUS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

Embodiments disclosed herein relate to lubrication of a reciprocating apparatus such as a positive displacement pump, and more specifically to devices and methods to improve the efficiency, durability, performance, and operating characteristics of a reciprocating apparatus such as a positive displacement pump (for example, of the sort that might be used in pumping a wellbore servicing fluid).

BACKGROUND OF THE INVENTION

Positive displacement pumps, a type of reciprocating apparatus, are used in various phases of oilfield operations, for example, to pump water, cement, fracturing fluids, and other stimulation or servicing fluids. Pumps in oilfield operations often endure harsh conditions.

Lubrication of the components of a reciprocating apparatus, such as a positive displacement pump, is generally provided to reduce friction, reduce friction-related heat, remove particulate matter, and, thereby, improve the life and/or minimize failure of such apparatus or one or more of its components. Conventional flowpaths employed to provide lubricant to the components of a reciprocating apparatus can present one or more weak points in the system. For example, conventional flowpaths through the crankshaft can be a failure point under stress, as the holes themselves are located at points of high stress in the crankshaft. Likewise, flowpaths through the connecting rod can also be a source for stress-related failures. Further, conventional lubrication flowpaths may fail to provide a sufficient flow of lubricant to one of more components of a pump or similar apparatus. For example, where a flowpath or a portion thereof becomes obstructed, the flow of lubricant may be insufficient to adequately lubricate the reciprocating apparatus and, thus, potentially leading to premature failure of the apparatus or some component thereof. Therefore, an improved lubrication system that provides sufficient lubricant flow while avoiding or minimizing stress-related mechanical failures is needed, allowing for more effective oil field pumping operations in the face of such harsh operating conditions.

SUMMARY OF THE INVENTION

Disclosed herein is a positive displacement pump comprising a lubricant manifold comprising a first fluid pathway therein, a housing comprising a second fluid pathway therein, wherein the second fluid pathway is in fluid communication with the first fluid pathway, at least one crosshead slide arranged within the housing, wherein the crosshead slide comprises a third fluid pathway, and wherein the third fluid pathway is in fluid communication with the second fluid pathway; a crosshead configured to reciprocate within the at least one crosshead slide, wherein the crosshead comprises a fourth fluid pathway therein, wherein the fourth fluid pathway is in fluid communication with the third fluid pathway, wherein the crosshead comprises a wrist-pin having a fifth fluid pathway therein, and wherein the fifth fluid pathway is in fluid communication with the fourth fluid pathway, a crankshaft contained within the housing, and a connecting rod disposed between the crosshead and the crankshaft and connected thereto, wherein the connecting rod comprises a sixth fluid pathway therein, wherein the sixth fluid pathway is displaced from a centerline of the connecting rod, wherein the sixth fluid pathway is in fluid communication with the fifth fluid pathway, and wherein the crankshaft end of the connecting rod comprises a seventh fluid pathway in fluid communication with the sixth fluid pathway.

Also disclosed herein is a system for servicing a wellbore with a positive displacement pump comprising a source of a wellbore servicing fluid, and a first positive displacement pump comprising a lubricant manifold comprising a first fluid pathway therein, a housing comprising a second fluid pathway therein, wherein the second fluid pathway is in fluid communication with the first fluid pathway, at least one crosshead slide arranged within the housing, wherein the crosshead slide comprises a third fluid pathway, and wherein the third fluid pathway is in fluid communication with the second fluid pathway, a crosshead configured to reciprocate within the at least one crosshead slide, wherein the crosshead comprises a fourth fluid pathway therein, wherein the fourth fluid pathway is in fluid communication with the third fluid pathway, wherein the crosshead comprises a wrist-pin having a fifth fluid pathway therein, and wherein the fifth fluid pathway is in fluid communication with the fourth fluid pathway, a crankshaft contained within the housing, and a connecting rod disposed between the crosshead and the crankshaft and connected thereto, wherein the connecting rod comprises a sixth fluid pathway therein, wherein the sixth fluid pathway is displaced from a centerline of the connecting rod, wherein the sixth fluid pathway is in fluid communication with the fifth fluid pathway, and wherein the crankshaft end of the connecting rod comprises a seventh fluid pathway in fluid communication with the sixth fluid pathway, and a wellbore, wherein the wellbore servicing fluid is communicated from the source into the wellbore via the first positive displacement pump.

Further disclosed herein is a method of servicing a wellbore with a positive displacement pump comprising providing a source of a wellbore servicing fluid at the wellbore, and transporting a positive displacement pump to the wellbore, the positive displacement pump comprising a lubricant manifold comprising a first fluid pathway therein, a housing comprising a second fluid pathway therein, wherein the second fluid pathway is in fluid communication with the first fluid pathway, at least one crosshead slide arranged within the housing, wherein the crosshead slide comprises a third fluid pathway, and wherein the third fluid pathway is in fluid communication with the second fluid pathway, a crosshead configured to reciprocate within the at least one crosshead slide, wherein the crosshead comprises a fourth fluid pathway therein, wherein the fourth fluid pathway is in fluid communication with the third fluid pathway, wherein the crosshead comprises a wrist-pin having a fifth fluid pathway therein, and wherein the fifth fluid pathway is in fluid communication with the fourth fluid pathway, a crankshaft contained within the housing, and a connecting rod disposed between the crosshead and the crankshaft and connected thereto, wherein the connecting rod comprises a sixth fluid pathway therein, wherein the sixth fluid pathway is displaced from a centerline of the connecting rod, wherein the sixth fluid pathway is in fluid communication with the fifth fluid pathway, and wherein the crankshaft end of the connecting rod comprises a seventh fluid pathway in fluid communication with the sixth fluid pathway, fluidly coupling the positive displacement pump to the source of the wellbore servicing fluid and to the wellbore, and communicating the wellbore servicing fluid to the wellbore via the pump.

DETAILED DESCRIPTION

Disclosed herein is a reciprocating apparatus lubrication system. In an embodiment, such a lubrication system may provide continuous lubrication of one or more of the components of a reciprocating apparatus. Lubrication via such a lubrication system may decrease friction between the components of the reciprocating apparatus, decrease component wear, cool components, decrease equipment failures, or combinations thereof.

Figure 1:
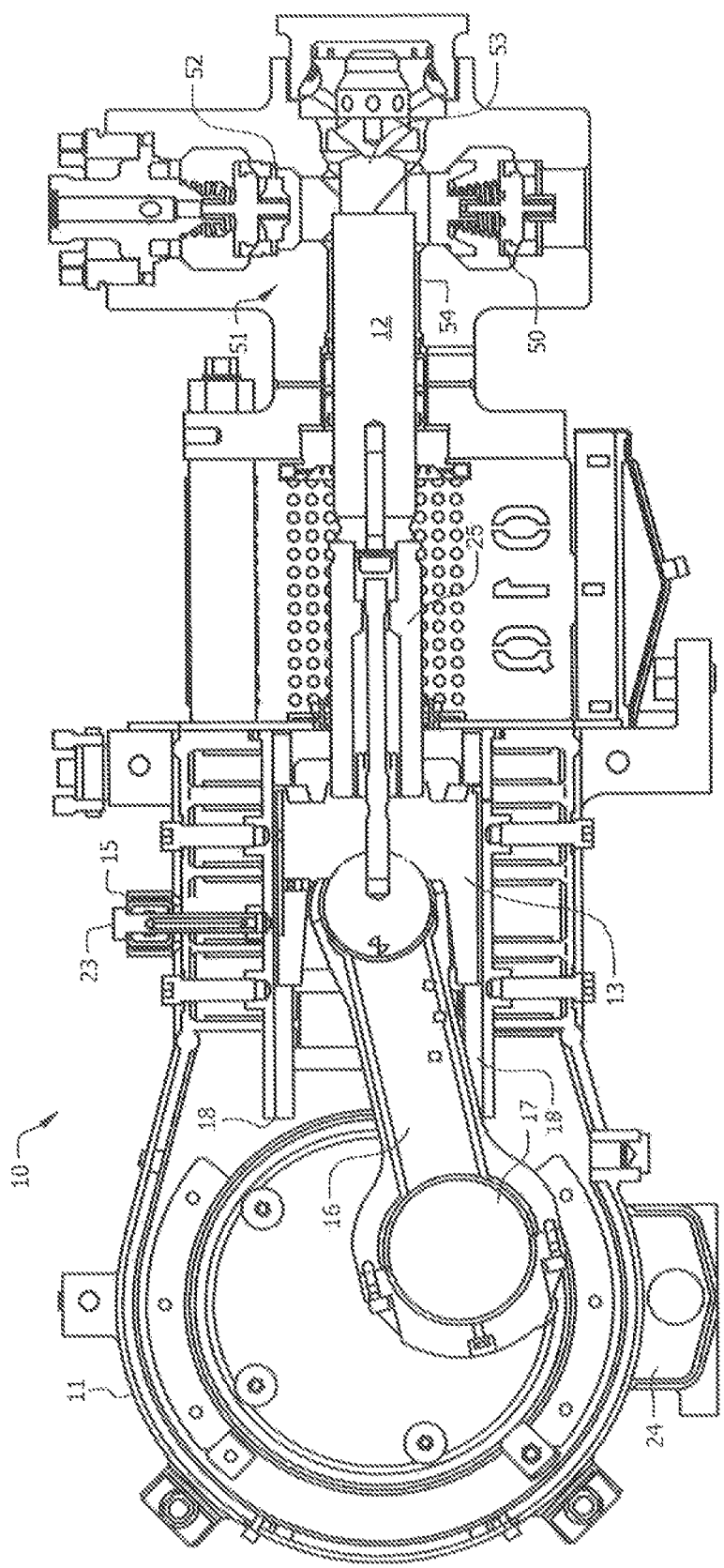
FIG. 1 is a cut-away illustration of an embodiment of a reciprocating apparatus, such as a pump.

Referring to FIG. 1, an embodiment of a reciprocating apparatus comprising a lubrication system, as will be disclosed herein, is illustrated. In the embodiment of FIG. 1, the reciprocating apparatus comprises a pump 10 (e.g., a positive displacement pump, as will be discussed herein). Though various embodiments of a reciprocating apparatus may be described with regard to a pump such as the pump 10, in alternative embodiments, as will be disclosed herein, the reciprocating apparatus may comprise any suitable reciprocating apparatus.

In an embodiment, the pump 10 generally comprises a housing 11, one or more crosshead slides 18 arranged and/or affixed within the housing 11, and a crosshead 13 configured and/or situated to slidably reciprocate within one or more crosshead slides 18. The pump 10 further comprises a crankshaft 14, the rotation of which drives the crosshead 13 reciprocally within the crosshead slides 18, the reciprocal motion being transferred to the crosshead 13 by a connecting rod 16 extending between the crankshaft 14, and to a plunger 12 by a pushrod 25 extending between the crosshead 13 and the plunger 12. The pump 10 may further comprise a manifold 15 arranged on or about the housing 11 and connected thereto via a fastener 23 which may comprise a part of the lubrication system.

In an embodiment, the pump 10 comprises only one crosshead 13 with associated crosshead slides, connecting rod 16, pushrod 25, and plunger 12, as depicted in FIG. 1. However, in an alternative embodiment, a pump like pump 10 may comprise a plurality of crossheads like crosshead 13, each having associated crosshead slides, an associated connecting rod, an associated pushrod, and an associated plunger. In such a multi-crosshead reciprocating apparatus, all crossheads and associated componentry (e.g., connecting rod, push-rod, plunger, and the like, as will be discussed herein) may be similarly connected to a common crankshaft. Also, in such a multi-crosshead reciprocating apparatus, each crosshead and associated componentry may comprise a lubrication system (e.g., the series of flowpaths, flow-bores, conduits, and connections as will be discussed herein); alternatively, in a multi-crosshead embodiment, two or more crossheads may share at least a portion of such a lubrication system.

In an embodiment, the crankshaft 14 of the pump 10 may be coupled to an engine, motor, or other source of rotational power, in a known manner, to drive the crankshaft 14 and power the pump 10. Hereinafter, the term "motor" will be used to refer to any source of rotational power, such as an engine, a motor, or similar. It should be understood that any reference to a motor should not be considered as limiting, but may include any source of rotational power and their equivalents. In an embodiment, the rotation of the crankshaft 14 causes connecting rod 16 to push and pull the crosshead 13 back and forth within the crosshead slides 18, thereby causing the plunger 12, which is operably coupled and/or connected to the crosshead 13 via the pushrod 25, to reciprocate within a generally cylindrical bore (e.g., a cylinder 54) in a fluid end section 51 of the pump 10.

With each reciprocation of the plunger 12, a given volume of the fluid is pumped. For example, in the embodiment of FIG. 1, the fluid end section 51 may comprise a suction valve 50 through which fluid may be drawn into a chamber 53 in the fluid end section 51 and a discharge valve 52 through which fluid may be expelled from the chamber 53. The suction valve 50 may be connected to a source, such as a suction header or similar, containing the fluid to be pumped (the "pumped fluid"). As will be described herein, the pumped fluid may comprise a liquid or a gas (e.g., a wellbore servicing fluid), as may be appropriate for a given application.

In an embodiment, the retraction of the plunger 12 (e.g., as the plunger 12 is pulled by the pushrod 25, the pushrod being operably coupled to the crosshead 13, the crosshead 13 being operably coupled to the connecting rod 16 via a wrist-pin 20 and/or a wrist-pin bearing 21, the connecting rod 16 being operably coupled to the crankshaft 14) draws a volume of the pumped fluid into the chamber 53 via the suction valve 50 (e.g., the suction valve open to allow fluid to enter the chamber 53, then closes). The extension of the plunger 12 (e.g., as the plunger 12 is pushed by the pushrod 25, the crosshead 13, the connecting rod 16, and the crankshaft 14) forces the volume of pumped fluid out of the chamber 53 via discharge valve 52 (e.g., the discharge valve may open to allow fluid to be expelled from the chamber 53, then closes). As such, the pump 10 may be employed to convey fluid.

In an embodiment the lubrication system of the disclosure comprises one or more flowpaths configured to circulate a fluid (e.g. a lubricant) to one or more of the components of the reciprocating apparatus (e.g. pump 10). In an embodiment, the lubricant may comprise any suitable type lubricant. For example, the lubricant may comprise a petroleum oil (commonly referred to as mineral oil), a synthetic oil, a natural (e.g., vegetable or plant-derived oil), or combinations thereof. Nonlimiting examples of suitable type of lubricant include hydrogenated polyalpha-olefins (PAO), synthetic esters, polyalkylene glycols (PAG), phosphate esters, alkylated naphthalenes (AN), silicate esters, ionic fluids, silicones, fluorocarbons, paraffinic fluids, mineral oils, or combinations thereof. In an embodiment, the lubricant may comprise any suitable additive. Nonlimiting examples of a suitable additives include antioxidants, detergents, antiwear additives, metal deactivators, corrosion inhibitors, rust inhibitors, friction modifiers, anti-foaming agents, viscosity modifiers, demulsifying agents, emulsifying agents, or combinations thereof. In an embodiment, a suitable lubricant may be characterized as having a suitable weight and/viscosity, as will be appreciated by one of ordinary skill in the art viewing this disclosure.

Figure 1A:
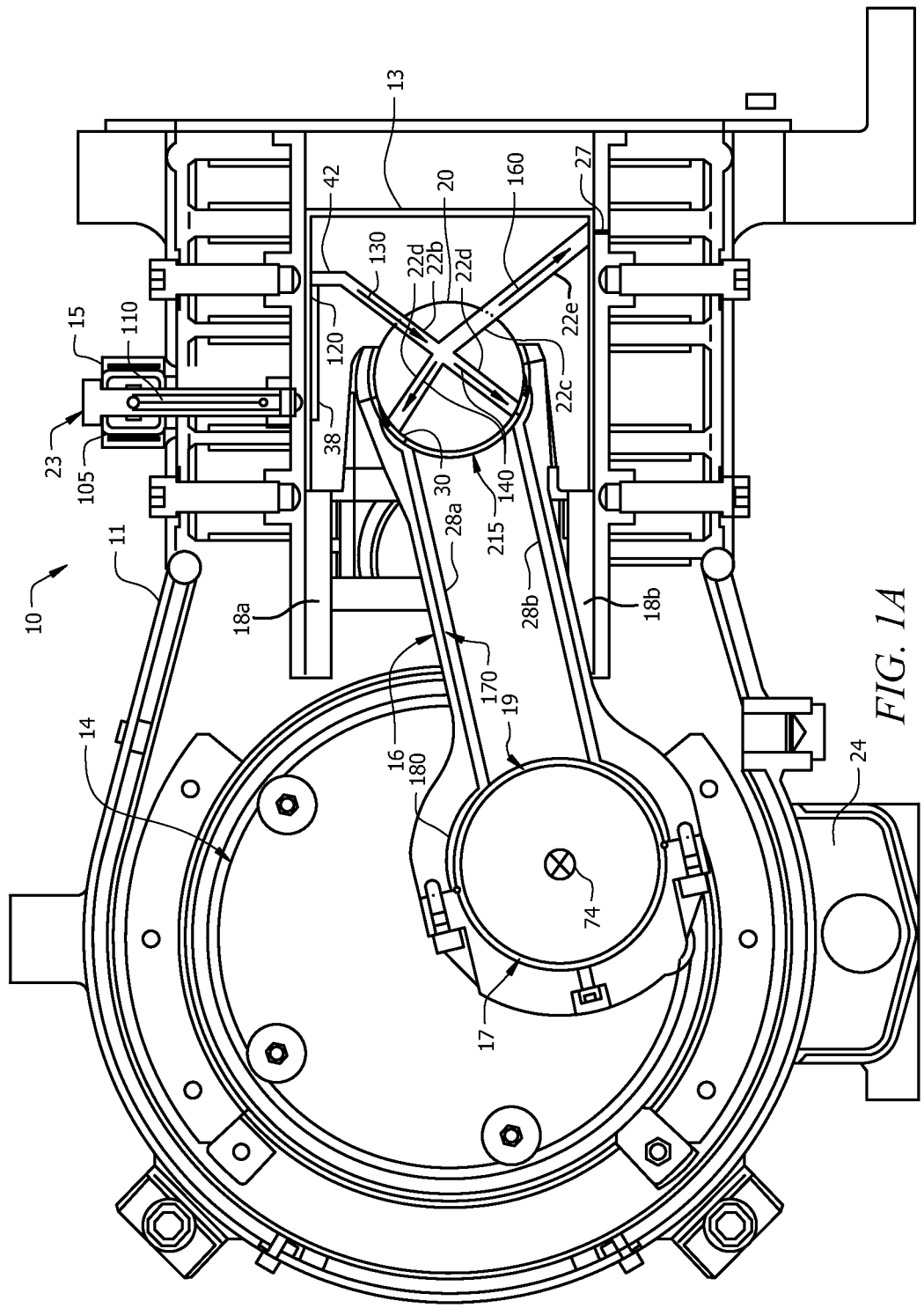
FIG. 1A a cut-away illustration of an embodiment of a portion of a reciprocating apparatus.

Referring to FIG. 1A, in an embodiment the lubrication system may comprise a series of flowpaths, flowbores, fluid pathways, and the like and may be characterized as a circulatory (or recirculatory) system. The description of some portion of the lubrication system as comprising galleys, ducts, ports, bores, channels, pathways, flowpaths, and/or fluid pathways should not be construed as limiting such pathways to any particular form or function. In various embodiment, such terms may be used interchangeably. In the embodiments that follow, one or more of these galleys, ducts, ports, bores, channels, pathways, flowpaths, and/or fluid pathways may be characterized as having a suitable size (e.g., diameter) and allowing for a given desired flowrate, as will be appreciated by one of skill in the art. In an embodiment as will be discussed herein, a flowpath of the type and/or configuration disclosed herein may be divided into multiple, similar paths. For example, a given flowpath may be divided into two or more smaller flowpaths cumulatively having about the same cross-sectional area, allowing for about the same flowrate, or combinations thereof. Additionally or alternatively, the routing of a particular flowpath may be varied (e.g., in size, shape, orientation, etc.), for example to make advantageous use of available material suitable for forming said flowpath and/or for optimizing the overall strength of the component or components comprising that flowpath.

Below, the flowpath is described as arbitrarily beginning at an external lubrication supply. Generally, in the embodiment of FIG. 1A a lubricant is provided (e.g., circulated) from the external lubrication supply to a fluid pathway within the lubricant manifold 15; from the manifold fluid pathway to one or more channels at the interface between a first of the crosshead slides 18 and the crosshead 13 via a flowpath of the fastener 23; from the one or more channels at the interface between the crosshead slide 18 and the crosshead 13 through one or more flowbores or fluid pathways in the crosshead 13, the wrist-pin 20, and the wrist-pin bearing 21 to a fluid galley at the interface between the wrist-pin bearing 21 and the inner surface of the connecting rod 16; from the fluid galley through a flowbore extending through the connecting rod 16, through flowbores 170 and 28b to a fluid galley at the interface of the connecting rod 16 and the crankshaft 14; and then returning to the sump 24. A detailed description of the components, the flowpaths, and/or portions thereof will be described herein with regard to pump 10.

In an embodiment, the housing 11 contains and supports the components of pump 10. Housing 11 may be formed, for example, of cast iron or other suitable material to provide a rigid structure for the components of pump 10. The housing may be formed, for example by machining, to provide various fitments and configurations to form the appropriate structures and details of the housing 11.

In an embodiment, the housing 11 may be provided with additional ports or ducts, for example, to allow for the circulation of a medium for heat transfer to/from the housing 11 and components therein (e.g., such as a coolant circulated through chambers of an engine). Further, the housing 11 may be provided with various combinations of inlets, outlets, connections, or the like, for example, for receiving and/or directing the pumped fluid. Further still, housing 11 may be provided with connections to various other components and/or systems such as piping, tanks, drive mechanisms, or other equipment via, for example, piping, flanges, connectors, or other appurtenances. In addition, cover plates or access ways may be provided on and/or within the housing 11, for example, to permit access for repair or inspection of the components of pump 10 and/or the housing 11, itself. The housing 11 may be detachably affixed to a platform or stage.

In an embodiment, the housing 11 comprises a collection point, hereinafter referred to as sump 24, in which fluid (e.g. a lubricant) circulated throughout the components of the pump 10 may collect. The sump 24 may be positioned such that lubricant may flow into or otherwise fill via gravitational flow of the lubricant (e.g., the sump 24 may be located at a "low point" within the housing"). For example, lubricant provided to one or more of the other components of the pump 10, as will be described herein, may flow and/or otherwise be returned to the sump 24.

In an embodiment, the lubricant manifold 15 may be provided with and/or attached to the housing 11. In an embodiment, the lubricant manifold 15 may be characterized as tubular. For example, the lubricant manifold 15 may have a rectangular cross-section (e.g. channel iron), and may be of a suitable length, as may be dependent upon the configuration and size of the pump 10. For example, the length of lubricant manifold 15 may depend on of the length of the housing 11, the number of crossheads 13 in the pump 10, and the distance between all of the crossheads 13. The lubricant manifold 15 may be configured to span the length of the housing, from one end to the other, and arranged to provide fluid communication to each of the crossheads in pump 10, as will be described in more detail, herein. The lubricant manifold 15 may be positioned at the top of and/or above the pump 10 or one or more components thereof (e.g., such that lubricant may flow by gravity, for example, and be returned to the sump 24). The lubricant manifold 15 may be arranged such that it is detachably affixed to, and in fluid communication with the housing as described in greater detail, below.

In an embodiment, the lubricant manifold 15 may be in fluid communication with the sump 24. For example, a fluid pathway (e.g., as demonstrated by flow arrow 105) extending through the lubricant manifold 15 (e.g., the channel of the aforementioned channel iron) may be arranged to receive lubricant from the sump 24, via a suitable means of transfer. For example, lubricant may be conveyed from the sump 24 to the lubricant manifold 15 via an internal or external lubricant pump. In an embodiment, the lubricant may be routed from the sump 24 to the lubricant manifold 15 via a suitable filtration device, for example, to remove sediment and/particulate material.

Alternatively, lubricant may be conveyed to the manifold 15 via a pressure differential or any suitable means of conveyance. In an alternative embodiment, fluid (e.g. lubricant) may be conveyed directly to one the channels at the interface between the crosshead 13 and the at least one of the one or more crosshead slides 18.

In an embodiment, the one or more fasteners 23 may detachably affix the lubricant manifold 15 to the housing 11. Generally, the fastener 23 may comprise a bolt, screw, rivet, or other suitable fastener. In an embodiment, the fastener 23 may comprise a fluid path in fluid communication with the manifold fluid pathway, as demonstrated by flow arrows 110 and 105, for example, such that fluid flowing via manifold fluid path (e.g., flow arrow 105) may flow via flowpath of the fastener (e.g., flow arrow 110).

Figure 6:
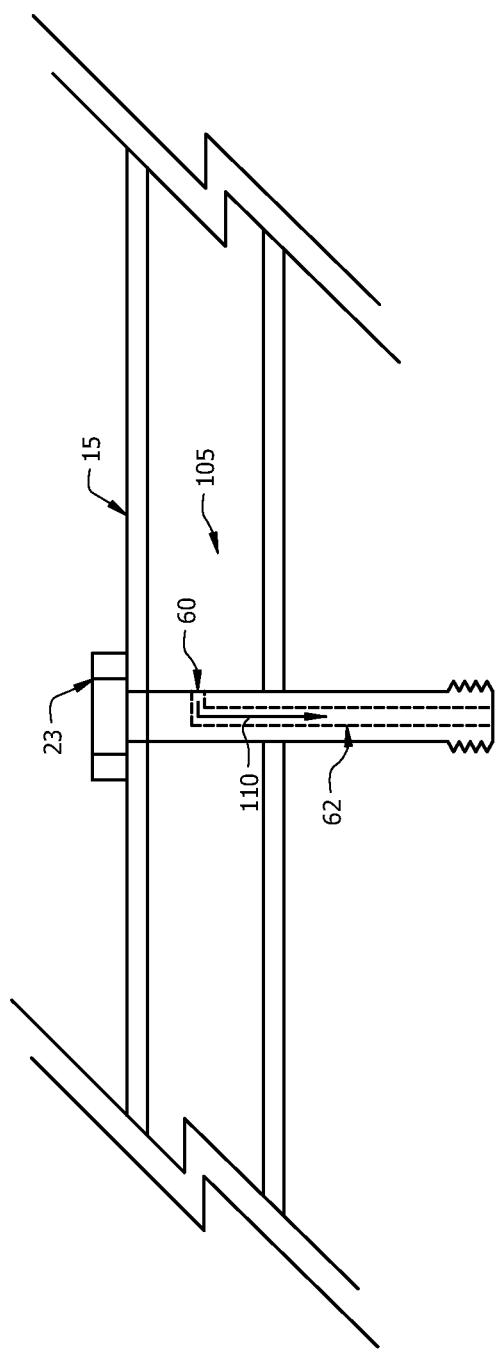
FIG. 6 is an illustration of an embodiment of a manifold and fastener.

Referring to FIG. 6, an embodiment of a fastener 23 is illustrated. In the embodiment of FIG. 6, the fastener 23 may be in fluid communication with the manifold fluid pathway 105. In the embodiment of FIG. 6, the fluid path 110 may comprise one or more bores through at least a portion of the fastener 23. For example, in the embodiment of FIG. 6, the fastener 23 comprises a first bore 60 and a second bore 62 intersecting and in fluid communication with the first bore 60 and thereby providing a route of fluid communication through the fastener 23.

In an additional or alternative embodiment, the fastener may be provided with various combinations of bores, slots, grooves, as may suitably allow fluid to flow within, in, on, through, or around the fastener 23 and provide a route of fluid communication from the lubricant manifold 15 into the housing 11.

In an embodiment, each of one or more crosshead slides 18 may generally comprise a guide or rail. In the embodiment illustrated in FIGS. 1, 1A and 3, two crosshead slides 18 are present. In alternative embodiments, a single crosshead slide 18 is present, alternatively, three, four, five, etc, crosshead slides like crosshead slides 18. The crosshead slides 18 may be disposed within at least a portion of the housing 11 to reciprocally receive the crosshead 13. For example, in an embodiment the crosshead slides 18 may comprise a first crosshead slide 18A and a second crosshead slide 18B (referred to in combination as crosshead slides 18) of sufficient length to contain the stroke or reciprocation of the crosshead 13. The crosshead slides 18 may comprise any suitable material. For example, crosshead slides 18 may be cast or otherwise formed from brass, steel, metal alloys, or the like. The crosshead slides 18 may be disposed within an opening that has been machined or cast into housing 11. Such an opening may be configured to accept and rigidly hold the crosshead slides 18 in place in an appropriate manner so as to facilitate interaction of the crosshead 13 with the other components of pump 10.

In an embodiment, the crosshead 13 may generally be characterized as cylindrical in shape. The crosshead 13 may generally comprise a head or crown, generally referring to the face of the crosshead being perpendicular to the direction of the crosshead's reciprocation, and a skirt, generally referring to the cylindrical walls of the crosshead 13. In an embodiment, the crosshead 13 may further comprise one or more crosshead shoes configured to interact with (e.g., reciprocally receive and/or slide against) the one or more crosshead slides 18. For example, each of the crosshead slides 18 may slide within and/or against a crosshead shoe. The crosshead 13 may be sized to slidably fit between and/or within the one or more crosshead slides 18. Additionally, the one or more crosshead slides 18 may be sized and/or spaced to slidably contain the crosshead.

In an embodiment, the crosshead 13 may be operably coupled via the pushrod 25 to the plunger 12, for example, such that reciprocation of the crosshead 13 may cause the pushrod 25 and plunger 12 to reciprocate within the cylinder 54 in the fluid end section 51 of the pump 10. In such an embodiment, the plunger 12 may be provided with suitable appurtenances to form a seal between plunger 12 and the cylinder 54. For example, seals (for example, "o-rings" or the like) may be arranged to fit within grooves or channels circumferentially provided around plunger 12 (e.g., within the skirt of the plunger). These seals may be sized such that they press against the inner walls of cylinder 54 and thereby provide a seal between the plunger 12 and the cylinder 54.

In an embodiment, one or more flow channels are provided at the interface between the crosshead 13 and the crosshead slides 18. Such flow channels may be in the form of a depression or groove within the surface of least one of the crosshead 13 or the crosshead slides 18.

Figure 2:
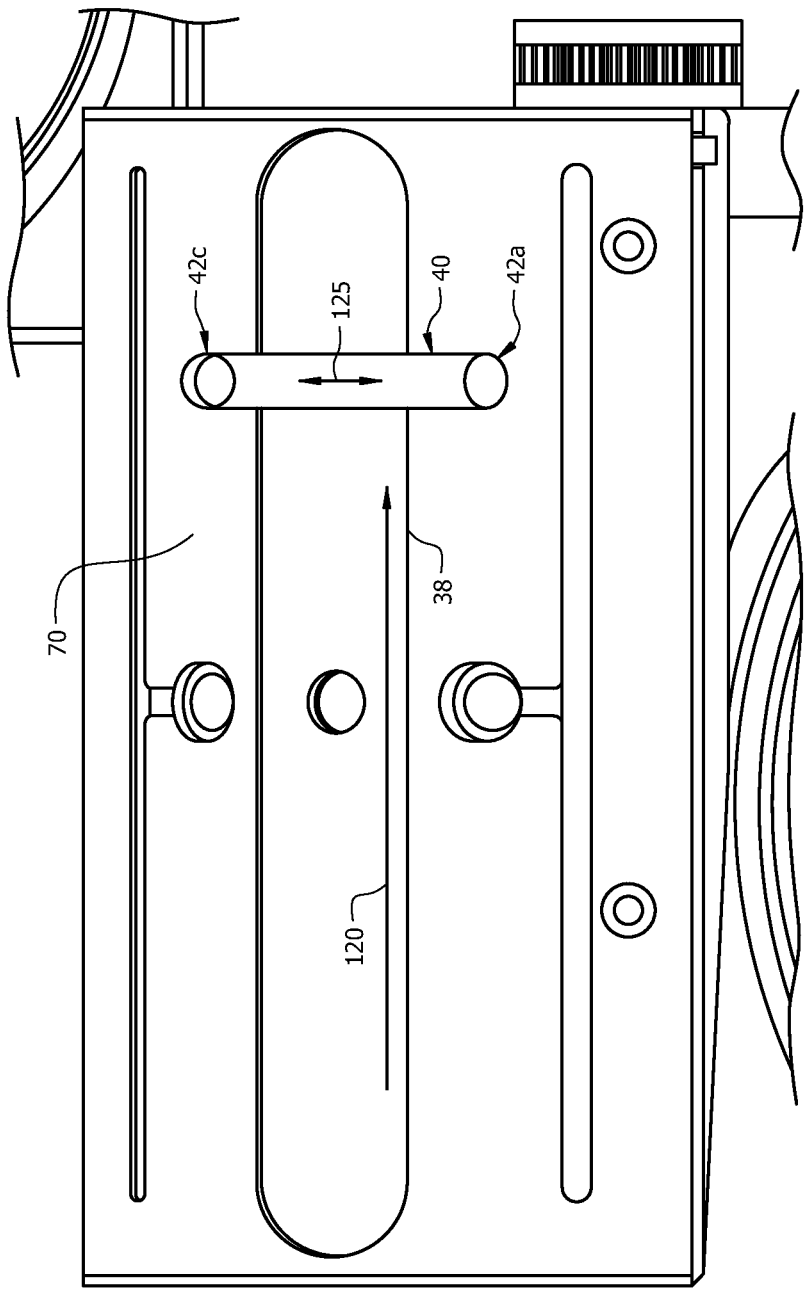
FIG. 2 is a detailed illustration of an embodiment of crosshead shoe.

Referring to FIG. 2, an embodiment of the flow channels is illustrated at the interface between the crosshead 13 and the crosshead slides 18 (e.g., at, on, or within an outer surface 70 of the crosshead 13). In the embodiment of FIG. 2, the flow channels comprise a first channel 38 and a second channel 40, both provided within or on the crosshead 13. Such channels may be provided by milling, casting, machining, or otherwise forming the channels (e.g., slots or grooves) in appropriate positions along the crosshead 13. In an embodiment, first channel 38 may be in fluid communication with second channel 40.

In the embodiment of FIG. 2 the first channel 38 may be in continuous fluid communication with the flowpath of the fastener 23. In such an embodiment, the first channel 38 may extend parallel to the direction of reciprocation (i.e., the stroke) of the crosshead 13 and may be aligned with the flowpath of the fastener 23. In such a configuration, the path defined by the first channel 38 will be in fluid communication with the flowpath of the fastener 23 at any point along the stroke of the crosshead 13, that is, as the crosshead 13 reciprocates within the crosshead slides 18. In the embodiment of FIG. 2, the second channel 40 may be substantially perpendicular to the first channel 38, and may be in fluid communication with the first channel 38.

In an embodiment, first channel 38 may comprise a fluid path and second channel 40 may likewise comprise a fluid path, as demonstrated by flow arrows 120 and 125, respectively. As explained above, the first channel may be in continuous fluid communication with the flowpath of the fastener 23. As such, fluid flowing via the flowpath of the fastener 23 (e.g., flow arrow 110) may flow via the fluid paths of the channels 38 and 40, as demonstrated by flow arrows 120 and 125 respectively.

In alternative embodiments, channels may be provided within the crosshead slides and may be configured for fluid communication with the flowpath of the fastener. For example, in an alternative embodiment, multiple fluid channels may be provided within the crosshead slides. In another alternative embodiment, at least one channel may be provided within the wall of the crosshead slides while another one or more channels are provided in the wall of the crosshead. Such channels may be configured to provide a route of fluid communication between the fastener 23 and bores within the crosshead 13, as will be disclosed in greater detail herein. For example, such channels or combinations of channels may extend parallel and/or perpendicular to the direction of reciprocation (i.e., the stroke) of the crosshead 13 and may be aligned with the flowpath of the fastener 23.

In an embodiment, the lubricant present in the flow channels at the interface between the crosshead 13 and the crosshead slides 18 may serve to lubricate the crosshead 13 as it reciprocates within the crosshead slides 18. For example, a portion of the lubricant may escape from the flow channels 38, 40 (e.g., by seepage) and into the interface between the crosshead 13 and the crosshead slides 18, particularly, the first crosshead slide 18A thereby forming a lubricating layer between the crosshead 13 and the first crosshead slide 18A.

In an embodiment, the crosshead 13 may comprise one or more flowbores extending from the surface 70 of the crosshead into the crosshead 13. In an embodiment as will be disclosed herein, various flowpaths may be provided in duplicate, triplicate, quadruple, etc. For example, multiple flowpaths extending into or through one or more components of the pump 10 or a portion thereof may be provided in two or more cross-sectional planes of such component. Referring again to FIG. 2, an anterior bore 42a posterior bore 42c (referred to generically alone or in combination as bore(s) 42) extend into the crosshead 13 from the second channel 40, and are thereby in fluid communication with second channel 40. In the embodiment, of FIGS. 2 and 3, bores 42a and 42c each extend into the crosshead 13 on a different vertical plane (e.g., an anterior vertical plane and a posterior vertical plane, with respect to FIG. 1). Each of bores 42a and 42c may be in fluid communication with a flowpath or series of flowpaths as will be discussed herein. A flowpath or series of flowpaths is disclosed with regard to a given vertical plane (e.g., the cross-sectional plane illustrated in FIGS. 1, 1A, 3, and 4), however, a similar flowpath or series of flowpaths may be provided in one or more additional vertical, cross-sectional planes. In an embodiment, bore 42 may extend into the crosshead perpendicular to the crosshead surface 70; alternatively, the bore may extend into the crosshead at a suitable angle. Bores 42 may comprise a route of fluid communication into the crosshead 13.

Figure 3:
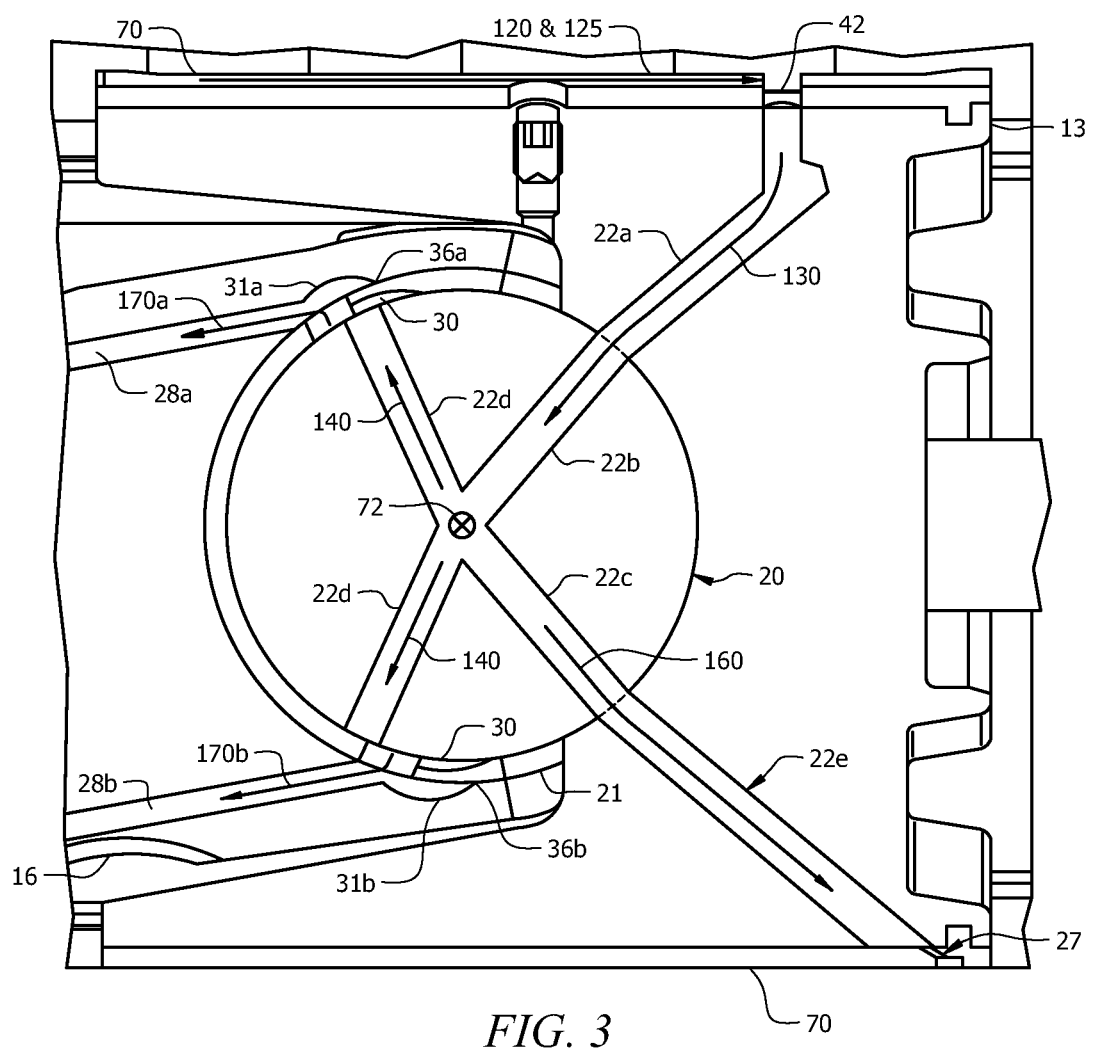
FIG. 3 is a cut-away illustration of an embodiment of a wrist-pin, a wrist-pin bearing, a crosshead, and a connecting rod.

Referring to FIG. 3, a detailed view of one cross-sectional plane of the crosshead 13, a wrist-pin 20, a wrist-pin bearing 21, and the connecting rod 16 is provided. In the embodiment of FIG. 3, the crosshead 13 comprises a plurality of fluid pathways, flowbores, flowpaths, and the like. In the embodiment of FIG. 3, the crosshead 13 comprises fluid pathway 22a and bore 42, which extends into the crosshead 13 and intersects fluid pathway 22a. Thus, in the embodiment of FIG. 3, fluid pathway 22a is thus in fluid communication with bore 42. In such an embodiment, lubricant flowing via the first and second channels, 38 and 40 respectively, at the interface between the crosshead 13 and the crosshead slides 18, will flow into the bore 42 and the fluid pathway 22a within the crosshead 13, as demonstrated by flow arrow 130.

Figure 4:
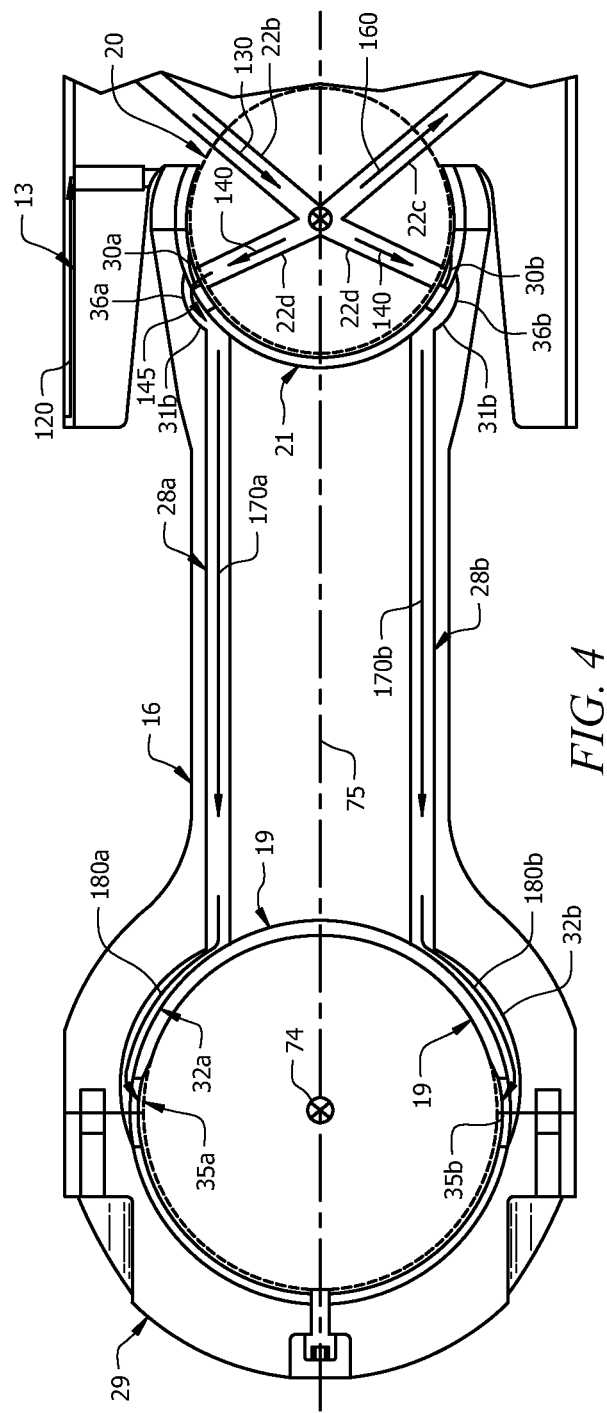
FIG. 4 is a cut-away illustration of an embodiment of a connecting rod and an end cap.

Referring again to FIGS. 1, 1A, and 3 and also to FIG. 4, the crosshead 13 may be rotatably or pivotably coupled to the connecting rod 16 via a wrist-pin 20. In an embodiment, the crosshead 13 comprises a wrist-pin hole extending through the crosshead 13 perpendicular to the direction of reciprocation of crosshead 13, and configured to accept a wrist-pin 20. A first end of the connecting rod 16, referred to as the "small end," may at least partially encompass a wrist-pin bearing 21, via which the connecting rod 16 may be coupled to the crosshead 13. The wrist-pin bearing 21 may comprise any suitable form of bearing (e.g., a journal, bushing, sleeve, roller bearing, or the like). The wrist-pin bearing 21 may be sized and/or configured to accept the wrist-pin 20. The wrist-pin bearing 21 may be made of any suitable material, a non-limiting example of which includes babbitt metal, bronze, graphite, various metal alloys, and the like.

In an embodiment, the wrist-pin hole in the crosshead 13 and the wrist-pin bearing 21 in the small end of the connecting rod 16 may be coaxially aligned and the wrist-pin 20 may be inserted and affixed within and the wrist-pin hole in the crosshead 13 and the wrist-pin bearing 21, thereby detachably affixing the crosshead 13 to the connecting rod 16. As such, the connecting rod 16 may be free to rotate or pivot (at least partially) with respect to the crosshead 13, for example, about the wrist-pin 20 and/or wrist-pin bearing 21. In an embodiment, the wrist-pin 20 may be characterized as cylindrical in shape and may be sized to fit within the opening in wrist-pin bearing 21, as described above.

In an embodiment, the wrist-pin 20 may comprise one or more fluid flowpaths extending into and/or through the wrist-pin 20. For example, in the embodiment of FIGS. 3 and 4, the wrist-pin 20 may be provided with flowpaths 22b, 22c, and 22d, described in greater detail herein. In the embodiment of FIG. 3, flowpath 22b extends at least partially into the wrist-pin 20 perpendicular to the longitudinal axis of the wrist-pin 20. The flowpath 22b may be aligned with fluid pathway 22a in the crosshead 13. Flowpath 22b may be in fluid communication with fluid pathway 22a, for example, such that lubricant flowing via fluid pathway 22a will flow into and via flowpath 22b, as demonstrated by flow arrow 130.

Also in the embodiment of FIG. 3, flowpaths 22c and 22d extend at least partially into the wrist-pin 20 perpendicular to the longitudinal axis 72 of the wrist-pin 20. Flowpaths 22c and 22d may intersect flowpath 22b. Flowpaths 22c and 22d may be in fluid communication with flowpath 22b, for example, such that lubricant flowing via fluid pathway 22b will flow into and via flowpaths 22c and 22d as demonstrated by flow arrows 160 and 140, respectively.

Also in the embodiment of FIG. 3, the crosshead 13 comprises flowpath 22e. In an embodiment, flowpath 22e extends into the crosshead 13 and is aligned with flowpath 22c in the wrist-pin 20. Flowpath 22e may be in fluid communication with flowpath 22c, for example, such that lubricant flowing via flowpath 22c will flow into and via flowpath 22e, as demonstrated by flow arrow 160. In an embodiment, an outlet port 27 may be provided at the end of flowpath 22e. The outlet port 27 may generally comprise an orifice of a size sufficiently small to control the passage of a fluid, such as lubricant, therethrough. The outlet port 27 may be appropriately sized and configured to provide limited flow via flowpath 22e. For example, the outlet port may provide backpressure such that lubricant will flow through various other pathways (e.g., flowpath(s) 22d).

In an embodiment, the lubricant emitted via outlet port 27 may serve to lubricate the crosshead 13 as it reciprocates within the crosshead slides 18, particularly, as it slides against the second crosshead slide 18B. For example, a portion of the lubricant may be emitted into the interface between the crosshead 13 and the second crosshead 18B, thereby forming a lubricating layer between the crosshead 13 and the crosshead 18B.

Referring again to FIGS. 1A, 3 and 4, in an embodiment at least one duct 30 may be present at the interface between the wrist-pin 20 and the wrist-pin bearing 21. The duct 30 may generally comprise a void-space at the interface between the wrist-pin 20 and the wrist-pin bearing 21. The duct 30 may be characterized as a slot, depression, or groove. The duct 30 may extend longitudinally substantially parallel to the axis of the wrist-pin 20 and/or the wrist-pin bearing 21. Alternatively, the duct 30 may extend in any suitable direction, for example, the duct may be characterized as extending in a "cork-screw" like fashion, a grid, or the like. In the embodiment of FIGS. 1A, 3, and 4, the duct 30 may comprise a slot or groove arranged on the internal surface of wrist-pin bearing 21. In alternative embodiments, the duct may be present on the outer surface of the wrist-pin 20, or on both the inner surface of the wrist-pin bearing 21 and the outer surface of the wrist-pin 20. In the embodiment of FIGS. 1A, 3, and 4, multiple ducts 30 may be present at the interface between the wrist-pin 20 and the wrist-pin bearing 21. In an embodiment, the duct 30 may be in fluid communication with fluid pathway 22d. For example, fluid flowing via the fluid pathway 22d may flow into and via the duct 30, as demonstrated by flow arrow 140.

In an embodiment, the lubricant present in the duct 30 may serve to lubricate the wrist-pin 20 and wrist-pin bearing 21 as the crosshead 13 reciprocates within the crosshead slides 18 resulting in the partial rotation of the connecting rod 16 with respect to the crosshead 13, for example, via the wrist-pin 20 and/or wrist-pin bearing 21. For example, a portion of the lubricant may escape from the duct 30 (e.g., by seepage) and into the interface between the wrist-pin 20 and the wrist-pin bearing 21, thereby forming a lubricating layer between the wrist-pin 20 and the wrist-pin bearing 21.

Referring again to FIGS. 1A, 3, and 4, in an embodiment the wrist-pin bearing 21 may further comprise a bore 36. The bore 36 may extend through wrist-pin bearing 21. In the embodiment of FIGS. 1A, 3, and 4, the bore 36 may extend radially (with respect to the longitudinal axis 72 of the wrist-pin 20 and/or wrist-pin bearing) through the wrist-pin bearing 21. The bore 36 may be at least partially aligned with fluid pathway 22*d* of the wrist-pin and/or the duct 30. In the embodiment of FIGS. 1A, 3, and 4, multiple bores 36 may be present in the wrist-pin bearing 21. For example, the wrist-pin bearing 21 may comprise a first bore 36*a* and a second bore 36*b* (referred to generically alone or in combination as bore(s) 36). The bore 36 may be in fluid communication with fluid pathway 22*d* of the wrist-pin and/or the duct 30, for example, such that lubricant flowing via the fluid pathway 22*d* of the wrist-pin and/or the duct 30 will flow into and via the bore 36, as demonstrated by flow arrows 140 and 145.

Referring again to FIGS. 1, 1A, 3, and 4, the connecting rod 16 may be characterized as an elongated member suitable for translating the rotational motion of the crankshaft 14 into the reciprocation of the crosshead 13. In an embodiment, the connecting rod 16 may be made of any suitable material. For example, the connecting rod 16 may be cast or otherwise formed from steel, metal alloys, or the like. In an embodiment, connecting rod 16 may be of any suitable size. As described above, the connecting rod 16 may be detachably, rotatably affixed to crosshead 13 via the wrist-pin 20 and the wrist-pin bearing 21. As described above, the connecting rod 16 may at least partially encompass a wrist-pin bearing 21 which may be coaxially aligned with the wrist-pin hole and the wrist-pin 21 inserted and affixed to detachably, rotatably couple the connecting rod 16 and crosshead 13.

Referring again to FIGS. 1A, 3, and 4, in an embodiment, the connecting rod 16 comprises a small-end galley 31. The small-end galley 31 may be characterized as comprising a generally scalloped depression. In the embodiment of FIGS. 1A, 3, and 4, the small-end fluid galley 31 may be present at the interface between the wrist-pin bearing 21 and the inner surface of the small-end of the connecting rod 16. For example, the small-end fluid galley 31 may be present in the inner surface (e.g., the inner wall) of the connecting rod 16. In the embodiment of FIGS. 1A, 3, and 4, the connecting rod 16 comprises multiple small-end fluid galleys, 31. For example, the connecting rod 16 may comprise a first small-end fluid galley 31*a* and a second small-end fluid galley 31*b* (referred to generically alone or in combination as small-end fluid galley(s) 31). In the embodiment of FIGS. 1A, 3, and 4, at least one of the fluid galleys may be constantly aligned with one of the fluid pathways, 22*d*. For example, as the crosshead 13 reciprocates via the rotation of the crankshaft 14, the connecting rod may rotate or pivot (e.g., in a back-and-forth motion) about the wrist-pin 20 and/or the wrist-pin bearing 21, causing a first of the small-end fluid galleys 31 to move into and out of alignment with a first of the bores 36. In such an embodiment, the small-end fluid galleys 31 and/or bores 36 may be configured such that at least one of the small-end fluid galley's 31 will be at least partially aligned with one of the bores 36 at all times. For example, while a first of the multiple fluid galleys is not aligned with a first of the bores 36, a second of the multiple fluid galleys will be aligned with a second of the bores 36. Thus, in such an embodiment at least one of the small-end fluid galleys 31 may be in continuous fluid communication with fluid at least one of the bores 36. For example, fluid flowing via the bore 36 may flow into and via at least one of the small-end fluid galleys, 31, as demonstrated by flow arrows 140 and 145.

In an embodiment, the lubricant present in the small-end fluid galley 31 may serve to lubricate the wrist-pin bearing 21 and the connecting rod 16 as the crosshead 13 reciprocates within the crosshead slides 18 resulting in the partial rotation of the connecting rod 16 with respect to the crosshead 13, for example, via the wrist-pin 20 and/or wrist-pin bearing 21. For example, a portion of the lubricant may escape from the small-end fluid galley 31 (e.g., by seepage) and into the interface between the wrist-pin bearing 21 and the connecting rod 16 (e.g., the small-end of the connecting rod 16), thereby forming a lubricating layer between the wrist-pin bearing 21 and the connecting rod 16.

Referring again to FIGS. 1A, 3, and 4, in an embodiment, the connecting rod 16 comprises a longitudinal flowbore 28 extending from the end of the connecting rod 16 nearest the wrist-pin 20 (i.e., the small-end) to the end of the connecting rod 16 nearest the crankshaft 14 (referred to as the "big-end"). In the embodiment of FIGS. 1A, 3, and 4, the connecting rod 16 comprises multiple longitudinal flowbores 28, each longitudinal flowbore being associated with one of the small-end fluid galleys 31. For example, the connecting rod 16 may comprise a first longitudinal flowbore 28*a* and a second longitudinal flowbore 28*b* (referred to generically alone or in combination as longitudinal flowbores(s) 28). In an embodiment, the longitudinal flowbore 28 may be in fluid communication with the associated small-end fluid galley 31. For example, fluid flowing via the small-end fluid galley 31 may flow into and via the longitudinal flowbore 28, as demonstrated by flow arrow 170.

Referring to FIGS. 1, 1A, and 4, the connecting rod 16 may be rotatably coupled to the crankshaft 14 at a crankpin 17. In the embodiment, the crankshaft 14 may comprise any configuration suitable for translating the rotational motion of the crankshaft into reciprocating motion of the crosshead 13. In an embodiment, crankshaft 14 may be generally comprise a linear, rod-like shape. The crankshaft 14 may comprise any suitable material, nonlimiting examples of which include cast iron, steel, and various alloys. The crankshaft 14 may be formed by any suitable method, nonlimiting examples of which include machining, casting, or the like. The crankshaft 14 may further comprise various additional features as may be appropriate, for example lobes (e.g., for balancing the rotation of the pump 10), fitments for attachment to the housing 11, fitments for attaching to a motor or power unit (e.g., splines).

In an embodiment, the crankshaft 14 comprises the crankpin 17 (also commonly referred to as a "throw," or "crank-throw"). In an embodiment, the crankpin 17 may refer to the off-center (e.g., non-coaxial with respect to the axis of rotation of the crankshaft 14) portion of the crankshaft 14 to which the big-end of the connecting rod 16 is coupled and which imparts the reciprocating motion.

In the embodiment of FIGS. 1, 1A, and 4, the connecting rod 16 is coupled to the crankpin 17 via a crankpin bearing 19 and end-cap 29. The crankpin bearing 19 may comprise any suitable form of bearing (e.g., a, journal, bushing, sleeve, roller bearing or the like). In an embodiment, the crankpin bearing 19 may comprise two parts (e.g., two halves) that may be joined together. For example, the crankpin bearing 19 may be configured such that one half may be disposed within the end cap 29, and the other half may be similarly disposed within the big end of the connecting rod 16. Crankpin bearing 19 may be arranged such that, when end cap 29 is affixed to the big end of the connecting rod 16, the two halves of the crankpin bearing 19 are brought together so as to form the bearing lining the internal surface of the opening in the big-end of the connecting rod 16. The crankpin bearing 19 may be sized and/or configured to fit about the crankpin 17. The crankpin bearing 19 may be made of any suitable material, a non-limiting example of which includes babbitt metal, bronze, graphite, various metal alloys, and the like.

Also in the embodiment of FIGS. 1, 1A, and 4, the end-cap 29 may detachably secure the big-end of the connecting rod 16 around and/or about the crankpin bearing 19 and/or the crankpin 17. For example, the end-cap 29 and the big-end of the connecting rod 16 may be positioned about the crankpin 17 and the end-cap secured to the big-end of the connecting rod 16 by a suitable fastener, such as a bolt, pin, rivet, or the like.

Referring again to FIGS. 1A and 4, in an embodiment, the connecting rod 16 comprises a big-end fluid galley 32. The big-end fluid galley 32 may be characterized as comprising a generally scalloped depression. In the embodiment of FIGS. 1A and 4, the big-end fluid galley 32 may be present at the interface between the crankpin bearing 19 and the inner surface of the big-end of the connecting rod 16. For example, the big-end fluid galley 32 may be present in the inner surface (e.g., the inner wall) of the connecting rod 16. In the embodiment of FIGS. 1A and 4, the connecting rod 16 comprises multiple big-end fluid galleys, 32, each big-end fluid galley, 32, being associated with one of the longitudinal flowbores 28. In an embodiment, the big-end fluid galley 32 may be in fluid communication with the associated longitudinal flowbore 28. For example, fluid flowing via the longitudinal flowbore 28 may flow into and via the big-end fluid galley 32, as demonstrated by flow arrow 180.

In an embodiment, the lubricant present in the big-end fluid galley 32 may serve to lubricate the crankpin bearing 19 and the connecting rod 16 as the connecting rod 16 rotates about the crankpin 17. For example, a portion of the lubricant may escape from the big-end fluid galley 32 (e.g., by seepage) and into the interface between the crankpin bearing 19 and the connecting rod 16 (e.g., the big-end of the connecting rod 16), thereby forming a lubricating layer between the crankpin bearing 19 and the connecting rod 16.

Referring again to FIGS. 1A and 4, in an embodiment the crankpin bearing 19 may further comprise a bore 35. The bore 35 may extend through crankpin bearing 19. In the embodiment of FIGS. 1A and 4, the bore 35 may extend radially (with respect to the longitudinal axis 74 of the crankpin 17 and/or crankpin bearing 19) through the crankpin bearing 19. In the embodiment of FIGS. 1A and 4, the crankpin bearing 19 comprises multiple bores, 35. For example, the crankpin bearing 19 may comprise a first bore 35a and a second bore 35b (referred to generically alone or in combination as bores(s) 35). In an embodiment where the crankpin bearing 19 comprises multiple parts (e.g., two halves) which may be joined together, the bore 35 may be configured and/or arranged such that a portion of a given bore 35 is present in each part of the crankpin bearing (e.g., in each half of the two halves of crankpin bearing 19).

In the embodiment of FIGS. 1A and 4, at least one of the bores, 35, may be intermitantly aligned with one of the big-end fluid galleys, 32. For example, as the connecting rod 16 pivots about the crankpin 17 via the rotation of the crankshaft 14, the connecting rod 16 may rotate or pivot (e.g., in a circular motion) about the axis of rotation of the crankpin 17 and/or the crankpin bearing 19, causing a first of the big-end fluid galleys 32 to move into and out of alignment with a first of the bores 36. In such an embodiment, the big-end fluid galleys 32 and bores 35 may be configured such that fluid may be communicated therebetween when at least one of the multiple fluid galleys is aligned with a at least one of the bores 35. Thus, in such an embodiment at least one of the big-end fluid galleys 32 may be in intermittent fluid communication with fluid at least one of the bores 35. For example, fluid flowing via the bore 35 may flow into and via at least one of the big-end fluid galleys, 32, as demonstrated by flow arrow 180.

In an embodiment, the lubricant flowing via the bores 35 may serve to lubricate the crankpin 17 and crankpin bearing 19 as the connecting rod 16 rotates with respect to the crankpin 17, for example, via the crankpin 17 and/or crankpin bearing 19. For example, a portion of the lubricant may escape from the bores 35 (e.g., by seepage) and into the interface between the crankpin 17 and the crankpin bearing 19, thereby forming a lubricating layer between the crankpin 17 and the crankpin bearing 19.

In an embodiment, the lubricant may be returned to the sump 24. For example, as described herein, lubricant may seep into one or more of the clearances between two of more of the components (as described herein) of the pump 10. In such an embodiment, these clearances (e.g., at the interface between two or more components) may sufficient clearance to allow movement (e.g., seepage) of the lubricant. Lubricant may seep into, out of, and/or through such clearances and be returned (e.g., via the flow of gravity) to the sump 24; for example, via channels within the housing to the sump 24.

As such, in an embodiment, the pump 10 may be provided with a lubrication system in which lubricant may be delivered from the sump 24 to the manifold 15 by, for example, an external delivery mechanism such as a lubricant pump and associated conveyances (e.g. pipe or tubing). Lubricant may through the fluid pathway of the manifold 15 to fastener 23 (e.g., as shown by flow arrow 105) and through the fluid pathway of the fastener 23 (e.g., flow arrow 110) to flow channels 38 and 40 at the interface between the crosshead 13 and the first crosshead slide 18A. Lubricant may flow from flow channels 38 and 40 into bore 42 (e.g., flow arrow 120) and the fluid pathway 22a in the crosshead 13. Lubricant may flow from flowpath 22a to flowpaths 22b, 22c, and 22d in the wrist-pin 20 (e.g., flow arrow 130). Lubricant may also flow from flowpath 22c to flowpath 22e in crosshead 13 (e.g., flow arrow 160) via outlet port 27 to the interface between the crosshead 13 and the second crosshead slide 18B. In addition, lubricant may flow from flowpath 22d and into duct 30 in wrist-pin bearing 21, and through bore 36 into small-end fluid galley 31 in wrist-pin bearing 21 (e.g., flow arrow 140). From the small-end fluid galley, lubricant may flow into longitudinal flowbore 28 in the connecting rod 16 (e.g., flow arrow 145). Lubricant may flow the length of connecting rod 16 (e.g., flow arrow 180) and into big-end fluid galley 32 and from the big-end fluid galley 32 (e.g., flow arrow 180) through crankpin bearing bore 35 to the internal surfaces of crankpin bearing 19.

In an embodiment, the lubrication system disclosed herein may comprise a plurality of similar or identical flowpaths, flowbores, and fluid pathways, for example, to provide redundant lubricant flow to components of the pump 10. As discussed above with reference to bores 42a and 42c, a flowpath or series of flowpaths may provide lubricant in a plane substantially parallel to the entire flowpath described herein above.

Figure 5:
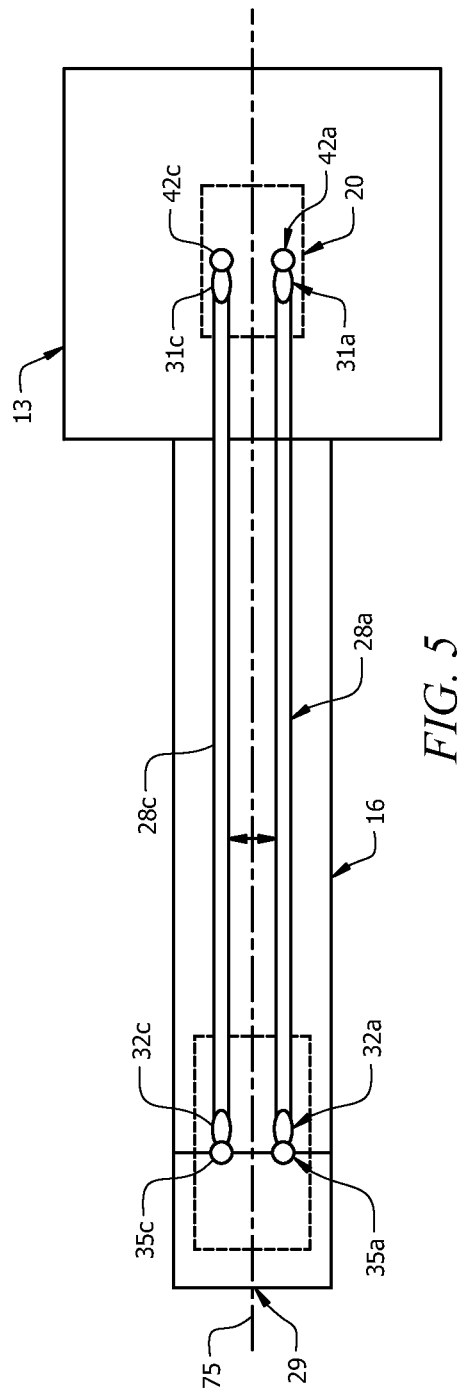
FIG. 5 is an illustration of an embodiment of a top view of a connecting rod, and an end cap.

For example, referring to FIG. 5, an embodiment of a top view of connecting rod 16 and crosshead 13, is shown. In the embodiment of FIG. 5, an additional lubricant flowpath, as described above, essentially alongside and parallel the flowpaths, fluid pathways, and flowbores may extend through the crosshead 13, wrist-pin 20, wrist-pin bearing 21, connecting rod 16, and to the crankpin 17. In an embodiment, each portion of the flowpath described in detail herein above may be replicated alongside the first flowpath, substantially parallel to the first flowpath.

In an additional embodiment, a third, a forth, or more complete lubricant flowpaths may be configured through crosshead 13, wrist-pin 20, wrist-pin bearing 21, connecting rod 16, and to the crankpin 17. In an embodiment, the portion of the overall flowpath extending from bore 42 to the crankpin 17 may be replicated in any appropriate manner or location through any/all of the components therebetween. In an embodiment, one or more additional lubricant pathways may be provided in some or all of the components of pump 10, as one of skill in the art viewing this disclosure will appreciate. For example, a flowpath is illustrated extending from bore 42c, through the crosshead 13 via various flowpaths (e.g., as may be similar to fluid pathway 22a in the crosshead 13 and flowpaths 22b, 22c, and 22d in the wrist-pin 20 to small-end fluid galley 31c (e.g., via various bores in wrist-pin bearing 21). From the small-end fluid galley 31c, lubricant may flow into and through longitudinal flowbore 28c in the connecting rod 16 into big-end fluid galley 32c and from the big-end fluid galley 32 through crankpin bearing bore 35c to the internal surfaces of crankpin bearing.

In an embodiment, the multiplicity of flowpaths provided may increase the total lubricant flow volume. Further, multiple flowpaths may provide a "backup" pathway for lubricant to flow, for example, should portions of one or more of the pathway become clogged, or otherwise unable to provide flow. As such, in an embodiment, the disclosed pump may provide increased lubricant delivery and/or redundant lubricant pathways.

In an embodiment, displacing the longitudinal flowbores 28 of the connecting rod 16 from the centerline 75 of the connecting rod 16, as disclosed herein with respect to FIGS. 1A, 4, and 5 may reduce mechanical failure of the connecting rod 16. For example, not intending to be bound by theory, displacing the flowbores from the centerline of the connecting rod 16 may avoid relatively high-stress points along the connecting rod 16, thereby minimizing and/or avoiding such mechanical failures (e.g., breaks, fractures, etc.).

In an additional embodiment, a lubrication flowpath may be absent through the crankshaft 14. In such an embodiment, the absence of a flowpath through the crankshaft may avoid stress-induced failures of the crankshaft. For example, a pump lubricated via a system as disclosed herein may not require such a flowpath through the crankshaft. As such, in such an embodiment, the disclosed pump may minimize or eliminate multiple points of mechanical stress, thereby providing improved pump life.

In an embodiment, the pump 10, as disclosed herein, may comprise any suitable type or configuration of pump. A non-limiting example of a suitable type and configuration of pump includes a positive displacement pump, for example, as may be employed in the performance of an oilfield or well servicing operation. For example, a positive displacement pump, such as pump 10, may be employed in the performance of a drilling operation, a fracturing operation, a perforating operation, a fluid loss operation, a primary cementing operation, a secondary or remedial cementing operation, or combinations thereof.

Figure 7:
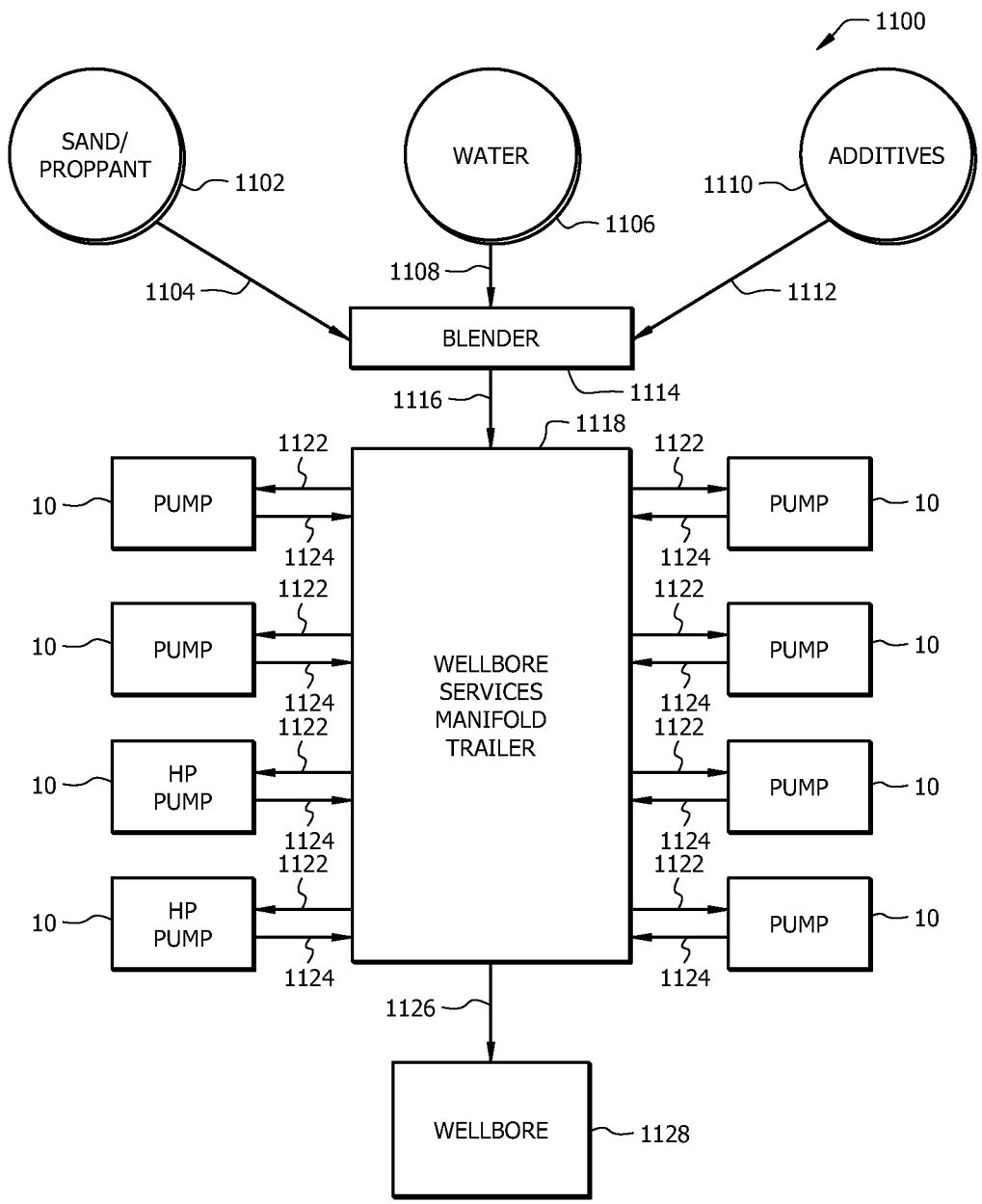
FIG. 7 is a schematic representation of an embodiment of a wellbore servicing system.

For example, referring to FIG. 7, an embodiment of a wellbore servicing system 1100 (e.g., a fracturing spread) is shown comprising a positive displacement pump such as the pump 10 disclosed herein. In the embodiment of FIG. 7, the wellbore servicing system 1100 is a system for fracturing wells in a hydrocarbon-containing reservoir. Although a wellbore servicing system is illustrated with regard to a fracturing operation, the pump disclosed herein may be employed in any suitable operation. In fracturing operations, wellbore servicing fluids, such as particle laden fluids, are pumped at high-pressure into a wellbore. The particle laden fluids may then be introduced into a portion of a subterranean formation at a sufficient pressure and velocity to cut a casing and/or create perforation tunnels and fractures within the subterranean formation. Proppants, such as grains of sand, are mixed with the wellbore servicing fluid to keep the fractures open so that hydrocarbons may be produced from the subterranean formation and flow into the wellbore. Hydraulic fracturing may desirably create high-conductivity fluid communication between the wellbore and the subterranean formation.

The wellbore servicing system 1100 comprises a blender 1114 that is coupled to a wellbore services manifold trailer 1118 via flowline 1116. As used herein, the term "wellbore services manifold trailer" includes a truck and/or trailer comprising one or more manifolds for receiving, organizing, and/or distributing wellbore servicing fluids during wellbore servicing operations. In this embodiment, the wellbore services manifold trailer 1118 is coupled to eight positive displacement pumps (e.g., such as pump 10) via outlet flowlines 1122 and inlet flowlines 1124. In alternative embodiments, however, there may be more or fewer pumps used in a wellbore servicing operation. Outlet flowlines 1122 are outlet lines from the wellbore services manifold trailer 1118 that supply fluid to the pumps 10. Inlet flowlines 1124 are inlet lines from the pumps 10 that supply fluid to the wellbore services manifold trailer 1118.

The blender 1114 mixes solid and fluid components to achieve a well-blended wellbore servicing fluid. As depicted, sand or proppant 1102, water 1106, and additives 1110 are fed into the blender 1114 via feedlines 1104, 1108, and 1112, respectively. The water 1106 may be potable, non-potable, untreated, partially treated, or treated water. In an embodiment, the water 1106 may be produced water that has been extracted from the wellbore while producing hydrocarbons form the wellbore. The produced water may comprise dissolved and/or entrained organic materials, salts, minerals, paraffins, aromatics, resins, asphaltenes, and/or other natural or synthetic constituents that are displaced from a hydrocarbon formation during the production of the hydrocarbons. In an embodiment, the water 1106 may be flowback water that has previously been introduced into the wellbore during wellbore servicing operation. The flowback water may comprise some hydrocarbons, gelling agents, friction reducers, surfactants and/or remnants of wellbore servicing fluids previously introduced into the wellbore during wellbore servicing operations.

The water 1106 may further comprise local surface water contained in natural and/or manmade water features (such as ditches, ponds, rivers, lakes, oceans, etc.). Still further, the water 1106 may comprise water stored in local or remote containers. The water 1106 may be water that originated from near the wellbore and/or may be water that has been transported to an area near the wellbore from any distance. In some embodiments, the water 1106 may comprise any combination of produced water, flowback water, local surface water, and/or container stored water.

In this embodiment, the blender 1114 is an Advanced Dry Polymer (ADP) blender and the additives 1110 are dry blended and dry fed into the blender 1114. In alternative embodiments, however, additives may be pre-blended with water using a GEL PRO blender, which is a commercially available preblender trailer from Halliburton Energy Services, Inc., to form a liquid gel concentrate that may be fed into the blender 1114. The mixing conditions of the blender 1114, including time period, agitation method, pressure, and temperature of the blender 1114, may be chosen by one of ordinary skill in the art with the aid of this disclosure to produce a homogeneous blend having a desirable composition, density, and viscosity. In alternative embodiments, however, sand or proppant, water, and additives may be premixed and/or stored in a storage tank before entering a wellbore services manifold trailer 1118.

In the embodiment of FIG. 7, the pumps 10 pressurize the wellbore servicing fluid to a pressure suitable for delivery into the wellhead 1128. For example, the pumps 10 may increase the pressure of the wellbore servicing fluid to a pressure of up to about 20,000 psi or higher.

From the pumps 10, the wellbore servicing fluid may reenter the wellbore services manifold trailer 1118 via inlet flowlines 1124 and be combined so that the wellbore servicing fluid may have a total fluid flow rate that exits from the wellbore services manifold trailer 1118 through flowline 1126 to the flow connector wellbore 1128 of between about 1 BPM to about 200 BPM, alternatively from between about 50 BPM to about 150 BPM, alternatively about 100 BPM. Persons of ordinary skill in the art with the aid of this disclosure will appreciate that the flowlines described herein are piping that are connected together for example via flanges, collars, welds, etc. These flowlines may include various configurations of pipe tees, elbows, and the like. These flowlines connect together the various wellbore servicing fluid process equipment described herein.

Also disclosed herein are methods of performing a wellbore servicing operation with a positive displacement pump such as the pump disclosed herein. In an embodiment, a wellbore servicing method may comprise transporting a positive displacement pump, for example the pump 10 disclosed herein, to site for the servicing operation (e.g., to a wellbore). In an embodiment, one or more pumps may be situated on a suitable structural support. Nonlimiting examples of a suitable structural support or supports include a trailer, truck, skid, barge or combinations thereof. In an embodiment a motor or other power source for the pump 10 and the pump 10 may be situated on a common structural support.

In an embodiment, a wellbore servicing method may further comprise providing a source for a wellbore servicing fluid. As described above, the wellbore servicing fluid may comprise any suitable fluid or combinations of fluid as may be appropriate based upon the servicing operation being performed. Nonlimiting examples of suitable wellbore servicing fluid include a fracturing fluid (e.g., a particle laden fluid, as described herein), a perforating fluid, a cementitious fluid, a sealant, a remedial fluid, a drilling fluid (e.g., mud), a spacer fluid, a gelation fluid, a polymeric fluid, an aqueous fluid, an oleaginous fluid, an emulsion, various other wellbore servicing fluid as will be appreciated by one of skill in the art with the aid of this disclosure, and combinations thereof. The wellbore servicing fluid may be prepared on-site (e.g., via the operation of one or more blenders) or, alternatively, transported to the site of the servicing operation.

In an embodiment, a wellbore servicing method may further comprise fluidly coupling the positive displacement pump to the wellbore servicing fluid source, for example, such that the wellbore servicing fluid may be drawn into and emitted from the positive displacement pump.

In an embodiment, a wellbore servicing method may further comprise conveying the wellbore servicing fluid from its source to the wellbore via the operation of the positive displacement, that is, pump 10 as disclosed herein.

In an alternative embodiment, the reciprocating apparatus may comprise a compressor. In an embodiment, similar to pump 10, such a compressor may comprise at least one each of a plunger, cylinder, connecting rod, crankshaft, and housing, and may be coupled to a motor. Like the crosshead and crosshead slides disclosed herein, a plunger may be likewise arranged to move in reciprocating fashion within a cylinder, similar to pump 10. In an embodiment, such a compressor may be similar in form to a pump and may be configured to compress a compressible fluid (e.g., a gas) and thereby increase the pressure of the compressible fluid. For example, a compressor may be configured to direct the discharge therefrom to a chamber or vessel that collects the compressible fluid from the discharge of the compressor until a predetermined pressure is built up in the chamber. Generally, a pressure sensing device may be arranged and configured to monitor the pressure as it builds up in the chamber and to interact with the compressor when a predetermined pressure is reached. At that point, the compressor may either be shut off, or alternatively the discharge may be directed to another chamber for continued operation.

In another alternative embodiment, a reciprocating apparatus comprises an internal combustion engine, hereinafter referred to as an engine. Such engines are also well known, and typically include at least one each of a piston, cylinder, connecting rod, and crankshaft. The arrangement of these components is substantially the same in an engine and a pump (e.g. pump 10). Like the crosshead and crosshead slides disclosed herein, a piston may be likewise arranged to move in reciprocating fashion within a cylinder, similar to pump 10. However, the operation of an engine may differ from that of a pump in that, in a pump, rotational power is applied to the crankshaft which acts on the plunger via the pushrod, the crosshead, and the connecting rod while, in an engine, a force (i.e., internal combustion) exerted on or against the piston acts on the crankshaft via the connecting rod and results in rotational power.

For example, in a typical 4-stroke engine, arbitrarily beginning with the exhaust stroke, the piston is fully extended during the exhaust stroke, (e.g., minimizing the internal volume of the cylinder). The piston may then be retracted by inertia or other forces of the engine componentry during the intake stroke. As the piston retracts within the cylinder, the internal volume of cylinder increases, creating a low pressure within the cylinder into which an air/fuel mixture is drawn. When the piston is fully retracted within the cylinder, the intake stroke is complete, and the cylinder is substantially filled with the air/fuel mixture. As the crankshaft continues to rotate, the piston may then be extended, during the compression stroke, into the cylinder compressing the air-fuel mixture within the cylinder to a higher pressure.

A spark plug may be provided to ignite the fuel at a predetermined point in the compression stroke. This ignition increases the temperature and pressure within the cylinder substantially and rapidly. Alternatively, in a diesel engine, the spark plug may be omitted, as the heat of compression derived from the high compression ratios associated with diesel engines suffices to provide spontaneous combustion of the air-fuel mixture. In either case, the heat and pressure act forcibly against the piston and cause it to retract back into the cylinder during the power cycle at a substantial force, which may then be exerted on the connecting rod, and thereby on to the crankshaft.

As such, given the similarity in form and structure between various reciprocating apparatuses (e.g., a pump, an engine, and/or a compressor) the lubrication system disclosed herein may be employed to any one or more of these or similar apparatuses. As such, although the lubrication system may be disclosed with regard to pump 10, the lubrication system may be applicable to many types of reciprocating devices, including but not limited to pumps, compressors, and engines.

Additional Disclosure

The following are nonlimiting, specific embodiments in accordance with the present disclosure:

Embodiment A: A positive displacement pump comprising:
   a lubricant manifold comprising a first fluid pathway therein;
   a housing comprising a second fluid pathway therein, wherein the second fluid pathway is in fluid communication with the first fluid pathway;
   at least one crosshead slide arranged within the housing, wherein the crosshead slide comprises a third fluid pathway, and wherein the third fluid pathway is in fluid communication with the second fluid pathway;
   a crosshead configured to reciprocate within the at least one crosshead slide, wherein the crosshead comprises a fourth fluid pathway therein, wherein the fourth fluid pathway is in fluid communication with the third fluid pathway, wherein the crosshead comprises a wrist-pin having a fifth fluid pathway therein, and wherein the fifth fluid pathway is in fluid communication with the fourth fluid pathway;
   a crankshaft contained within the housing; and
   a connecting rod disposed between the crosshead and the crankshaft and connected thereto, wherein the connecting rod comprises a sixth fluid pathway therein, wherein the sixth fluid pathway is displaced from a centerline of the connecting rod, wherein the sixth fluid pathway is in fluid communication with the fifth fluid pathway, and wherein the crankshaft end of the connecting rod comprises a seventh fluid pathway in fluid communication with the sixth fluid pathway.

Embodiment B: The positive displacement pump of Embodiment A, wherein the sixth fluid pathway comprises at least two fluid pathways, wherein the at least two fluid pathways are substantially parallel to and displaced from a centerline of the connecting rod.

Embodiment C: The positive displacement pump of Embodiments A or B, wherein the third fluid pathway comprises a first slot disposed within at least one of the at least two crosshead slides, the crosshead, or combinations thereof.

Embodiment D: The positive displacement pump of Embodiment C, wherein the third fluid pathway further comprises a second slot disposed within at least one of the at least two crosshead slides, the crosshead, or combinations thereof.

Embodiment E: The positive displacement pump of Embodiments C or D, wherein the first slot extends substantially parallel to the direction of reciprocation of the crosshead.

Embodiment F: The positive displacement pump of Embodiments D or E, wherein the second slot extends substantially perpendicular to the direction of reciprocation of the crosshead, and wherein the second slot is in fluid communication with the first slot.

Embodiment G: The positive displacement pump of any preceding Embodiment, wherein an internal fluid pathway is absent from the crankshaft.

Embodiment H: A system for servicing a wellbore with a positive displacement pump comprising:
   a source of a wellbore servicing fluid; and
   a first positive displacement pump comprising:
      a lubricant manifold comprising a first fluid pathway therein;
      a housing comprising a second fluid pathway therein, wherein the second fluid pathway is in fluid communication with the first fluid pathway;
      at least one crosshead slide arranged within the housing, wherein the crosshead slide comprises a third fluid pathway, and wherein the third fluid pathway is in fluid communication with the second fluid pathway;
      a crosshead configured to reciprocate within the at least one crosshead slide, wherein the crosshead comprises a fourth fluid pathway therein, wherein the fourth fluid pathway is in fluid communication with the third fluid pathway, wherein the crosshead comprises a wrist-pin having a fifth fluid pathway therein, and wherein the fifth fluid pathway is in fluid communication with the fourth fluid pathway;
      a crankshaft contained within the housing; and
      a connecting rod disposed between the crosshead and the crankshaft and connected thereto, wherein the connecting rod comprises a sixth fluid pathway therein, wherein the sixth fluid pathway is displaced from a centerline of the connecting rod, wherein the sixth fluid pathway is in fluid communication with the fifth fluid pathway, and wherein the crankshaft end of the connecting rod comprises a seventh fluid pathway in fluid communication with the sixth fluid pathway; and
   a wellbore, wherein the wellbore servicing fluid is communicated from the source into the wellbore via the first positive displacement pump.

Embodiment I: The system of Embodiment H, wherein the sixth fluid pathway of the first positive displacement pump comprises at least two fluid pathways, wherein the at least two fluid pathways are substantially parallel to and displaced from a centerline of the connecting rod.

Embodiment J: The system of Embodiment H, wherein an internal fluid pathway is absent from the crankshaft of the first positive displacement.

Embodiment K: The system of Embodiments H or J, wherein the wellbore servicing fluid comprises a fracturing fluid.

Embodiment L: The system of Embodiments H, J, or K, wherein the wellbore servicing fluid comprises a cementitious fluid.

Embodiment M: The system of Embodiment H, J, or K, wherein the wellbore servicing fluid comprises remedial fluid.

Embodiment N: The system of Embodiments H, J, K, L, or M, further comprising a second positive displacement pump configured substantially the same as the first positive displacement pump.

Embodiment O: The system of Embodiment N, further comprising a wellbore services manifold trailer, wherein the first positive displacement pump and the second positive displacement pump are both in fluid communication with the wellbore services manifold trailer.

Embodiment P: The system of Embodiments H, J, K, L, M, N, or O further comprising a blender, wherein the first positive displacement pump receives the wellbore servicing fluid from the blender.

Embodiment Q: A method of servicing a wellbore with a positive displacement pump comprising:
   providing a source of a wellbore servicing fluid at the wellbore; and
   transporting a positive displacement pump to the wellbore, the positive displacement pump comprising:

a lubricant manifold comprising a first fluid pathway therein;

a housing comprising a second fluid pathway therein, wherein the second fluid pathway is in fluid communication with the first fluid pathway;

at least one crosshead slide arranged within the housing, wherein the crosshead slide comprises a third fluid pathway, and wherein the third fluid pathway is in fluid communication with the second fluid pathway;

a crosshead configured to reciprocate within the at least one crosshead slide, wherein the crosshead comprises a fourth fluid pathway therein, wherein the fourth fluid pathway is in fluid communication with the third fluid pathway, wherein the crosshead comprises a wrist-pin having a fifth fluid pathway therein, and wherein the fifth fluid pathway is in fluid communication with the fourth fluid pathway;

a crankshaft contained within the housing; and a connecting rod disposed between the crosshead and the crankshaft and connected thereto, wherein the connecting rod comprises a sixth fluid pathway therein, wherein the sixth fluid pathway is displaced from a centerline of the connecting rod, wherein the sixth fluid pathway is in fluid communication with the fifth fluid pathway, and wherein the crankshaft end of the connecting rod comprises a seventh fluid pathway in fluid communication with the sixth fluid pathway;

fluidly coupling the positive displacement pump to the source of the wellbore servicing fluid and to the wellbore; and communicating the wellbore servicing fluid to the wellbore via the pump.

Embodiment R: The method of Embodiment Q, wherein the wellbore servicing fluid comprises a fracturing fluid.

Embodiment S: The method of Embodiment Q, wherein the wellbore servicing fluid comprises a cementitious fluid.

Embodiment T: The method of Embodiment Q, wherein the wellbore servicing fluid comprises remedial fluid.

While embodiments of the invention have been shown and described, modifications thereof can be made by one skilled in the art without departing from the spirit and teachings of the invention. For example, a portion of the wellbore servicing fluid placed in the wellbore 120 may be recycled, i.e., mixed with the water stream obtained from the water source 220 and treated in fluid treatment system 210. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+ k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Detailed Description of the Embodiments is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

We claim:

1. A positive displacement pump comprising:

a lubricant manifold comprising a first fluid pathway therein;

a housing comprising a second fluid pathway therein, wherein the second fluid pathway is in fluid communication with the first fluid pathway;

at least one crosshead slide arranged within the housing, wherein the crosshead slide comprises a third fluid pathway, and wherein the third fluid pathway is in fluid communication with the second fluid pathway;

a crosshead configured to reciprocate within the at least one crosshead slide, wherein the crosshead comprises a fourth fluid pathway therein, wherein the fourth fluid pathway is in fluid communication with the third fluid pathway, wherein the crosshead comprises a wrist-pin having a fifth fluid pathway therein, and wherein the fifth fluid pathway is in fluid communication with the fourth fluid pathway;

a crankshaft contained within the housing; and a connecting rod disposed between the crosshead and the crankshaft and connected thereto, wherein the connecting rod comprises a sixth fluid pathway therein, wherein the sixth fluid pathway is displaced from a centerline of the connecting rod, wherein the sixth fluid pathway is in fluid communication with the fifth fluid pathway, and wherein the crankshaft end of the connecting rod comprises a seventh fluid pathway in fluid communication with the sixth fluid pathway.

2. The positive displacement pump of claim 1, wherein the sixth fluid pathway comprises at least two fluid pathways, wherein the at least two fluid pathways are substantially parallel to and displaced from a centerline of the connecting rod.

3. The positive displacement pump of claim 1, wherein the third fluid pathway comprises a first slot disposed within at least one of the at least two crosshead slides, the crosshead, or combinations thereof.

4. The positive displacement pump of claim 3, wherein the third fluid pathway further comprises a second slot disposed within at least one of the at least two crosshead slides, the crosshead, or combinations thereof.

5. The positive displacement pump of claim 4, wherein the first slot extends substantially parallel to the direction of reciprocation of the crosshead.

6. The positive displacement pump of claim 5, wherein the second slot extends substantially perpendicular to the direction of reciprocation of the crosshead, and wherein the second slot is in fluid communication with the first slot.

7. The positive displacement pump of claim 1, wherein an internal fluid pathway is absent from the crankshaft.

8. A system for servicing a wellbore with a positive displacement pump comprising:
- a source of a wellbore servicing fluid; and
- a first positive displacement pump comprising:
  - a lubricant manifold comprising a first fluid pathway therein;
  - a housing comprising a second fluid pathway therein, wherein the second fluid pathway is in fluid communication with the first fluid pathway;
  - at least one crosshead slide arranged within the housing, wherein the crosshead slide comprises a third fluid pathway, and wherein the third fluid pathway is in fluid communication with the second fluid pathway;
  - a crosshead configured to reciprocate within the at least one crosshead slide, wherein the crosshead comprises a fourth fluid pathway therein, wherein the fourth fluid pathway is in fluid communication with the third fluid pathway, wherein the crosshead comprises a wrist-pin having a fifth fluid pathway therein, and wherein the fifth fluid pathway is in fluid communication with the fourth fluid pathway;
  - a crankshaft contained within the housing; and
  - a connecting rod disposed between the crosshead and the crankshaft and connected thereto, wherein the connecting rod comprises a sixth fluid pathway therein, wherein the sixth fluid pathway is displaced from a centerline of the connecting rod, wherein the sixth fluid pathway is in fluid communication with the fifth fluid pathway, and wherein the crankshaft end of the connecting rod comprises a seventh fluid pathway in fluid communication with the sixth fluid pathway; and
- a wellbore, wherein the wellbore servicing fluid is communicated from the source into the wellbore via the first positive displacement pump.

9. The system of claim 8, wherein the sixth fluid pathway of the first positive displacement pump comprises at least two fluid pathways, wherein the at least two fluid pathways are substantially parallel to and displaced from a centerline of the connecting rod.

10. The system of claim 8, wherein an internal fluid pathway is absent from the crankshaft of the first positive displacement.

11. The system of claim 8, wherein the wellbore servicing fluid comprises a fracturing fluid.

12. The system of claim 8, wherein the wellbore servicing fluid comprises a cementitious fluid.

13. The system of claim 8, wherein the wellbore servicing fluid comprises remedial fluid.

14. The system of claim 8, further comprising a second positive displacement pump configured substantially the same as the first positive displacement pump.

15. The system of claim 14, further comprising a wellbore services manifold trailer, wherein the first positive displacement pump and the second positive displacement pump are both in fluid communication with the wellbore services manifold trailer.

16. The system of claim 8, further comprising a blender, wherein the first positive displacement pump receives the wellbore servicing fluid from the blender.

17. A method of servicing a wellbore with a positive displacement pump comprising:
- providing a source of a wellbore servicing fluid at the wellbore; and
- transporting a positive displacement pump to the wellbore, the positive displacement pump comprising:
  - a lubricant manifold comprising a first fluid pathway therein;
  - a housing comprising a second fluid pathway therein, wherein the second fluid pathway is in fluid communication with the first fluid pathway;
  - at least one crosshead slide arranged within the housing, wherein the crosshead slide comprises a third fluid pathway, and wherein the third fluid pathway is in fluid communication with the second fluid pathway;
  - a crosshead configured to reciprocate within the at least one crosshead slide, wherein the crosshead comprises a fourth fluid pathway therein, wherein the fourth fluid pathway is in fluid communication with the third fluid pathway, wherein the crosshead comprises a wrist-pin having a fifth fluid pathway therein, and wherein the fifth fluid pathway is in fluid communication with the fourth fluid pathway;
  - a crankshaft contained within the housing; and
  - a connecting rod disposed between the crosshead and the crankshaft and connected thereto, wherein the connecting rod comprises a sixth fluid pathway therein, wherein the sixth fluid pathway is displaced from a centerline of the connecting rod, wherein the sixth fluid pathway is in fluid communication with the fifth fluid pathway, and wherein the crankshaft end of the connecting rod comprises a seventh fluid pathway in fluid communication with the sixth fluid pathway;
- fluidly coupling the positive displacement pump to the source of the wellbore servicing fluid and to the wellbore; and
- communicating the wellbore servicing fluid to the wellbore via the pump.

18. The method of claim 17, wherein the wellbore servicing fluid comprises a fracturing fluid.

19. The method of claim 17, wherein the wellbore servicing fluid comprises a cementitious fluid.

20. The method of claim 17, wherein the wellbore servicing fluid comprises remedial fluid.

* * * * *